Dec. 31, 1946.                A. M. STONER                2,413,421
                          DOUBLE ACTING CHUCK
                    Filed Nov. 13, 1944              2 Sheets-Sheet 2
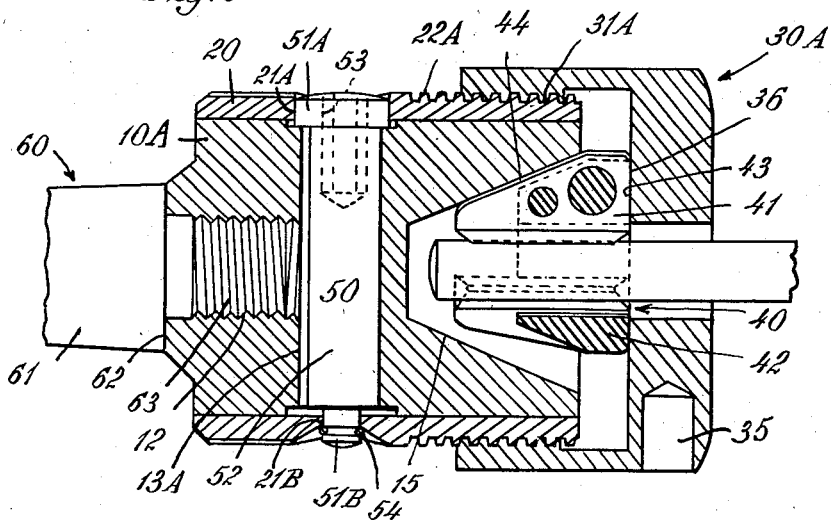
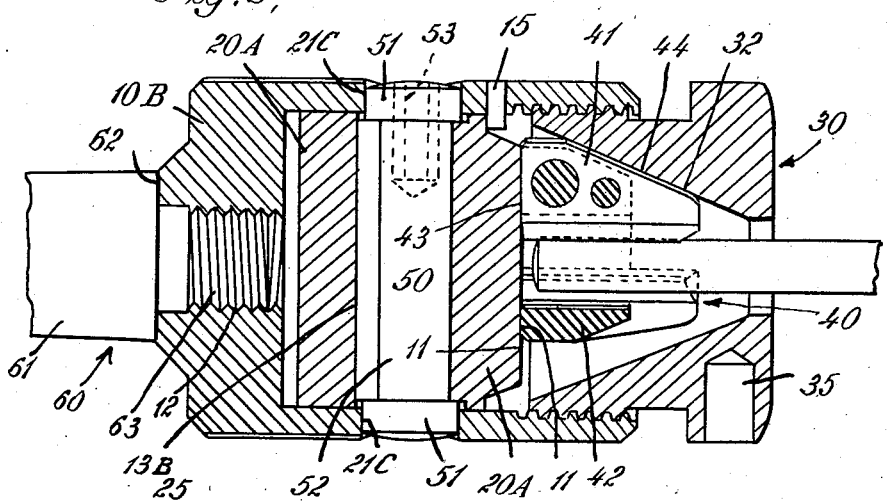
INVENTOR
*Arthur Merrick Stoner*
BY
*E. W. Marshall*
ATTORNEY Patented Dec. 31, 1946

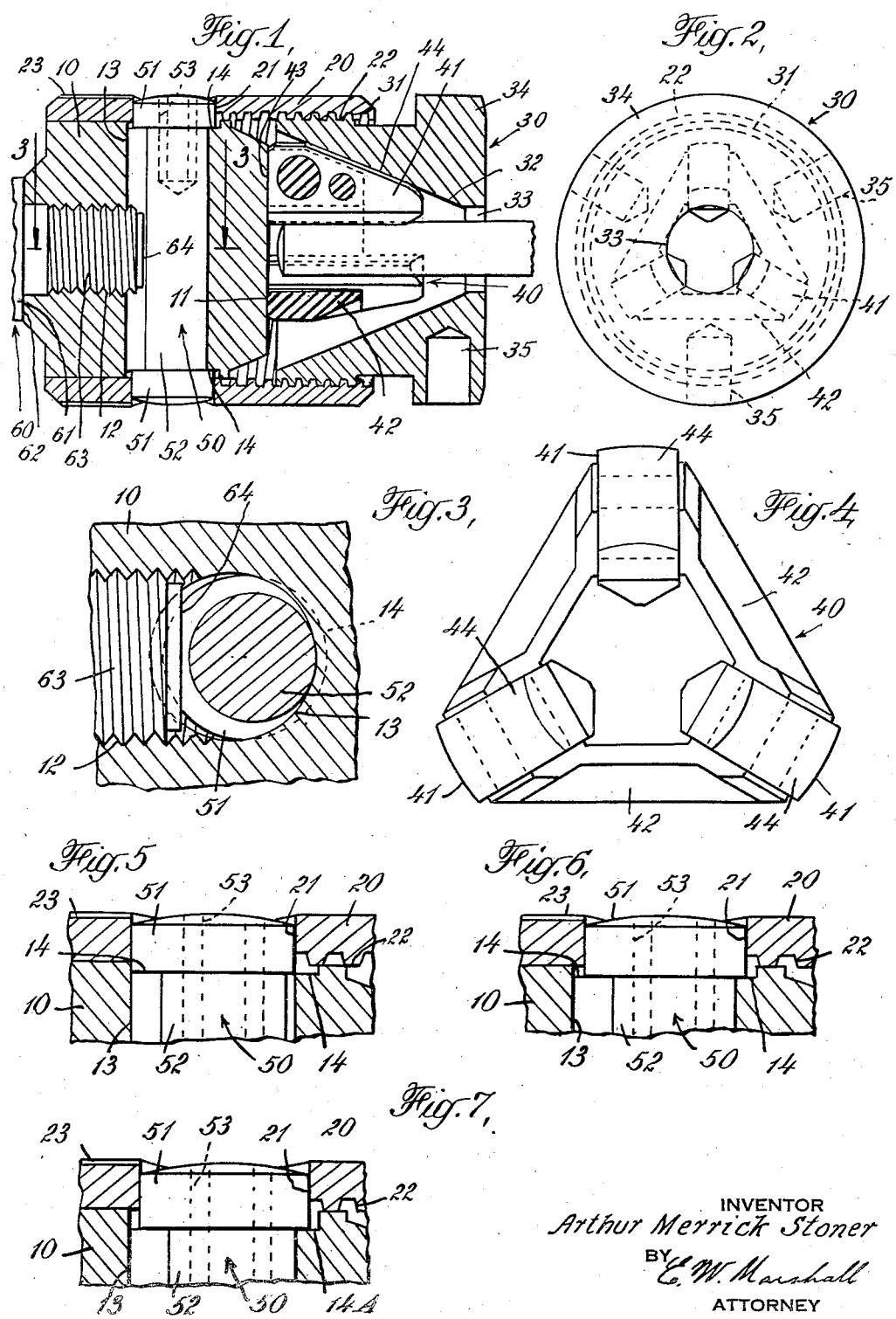

2,413,421

UNITED STATES PATENT OFFICE 2,413,421

DOUBLE-ACTING CHUCK

Arthur Merrick Stoner, West Hartford, Conn., assignor to The Jacobs Manufacturing Company, Hartford, Conn., a corporation of Connecticut Application November 13, 1944, Serial No. 563,190

12 Claims. (Cl. 279—51)

This invention relates to an improvement in a double acting chuck of the type in which the gripping elements are brought into initial contact with a tool or other article by the longitudinal movement imparted to a threaded part of the chuck by the rotation of such part and is then brought into final gripping engagement with the article by means of an eccentric cam. The object of the present invention is to provide a simple and inexpensive arrangement with few parts and of rugged construction which functions in the aforesaid manner, for a collet chuck or chucks of other types and to improve upon such instrumentalities as have been available heretofore.

In the drawings:

Fig. 1 is a sectional side elevation of a collet chuck which is made according to and embodies my invention.

Fig. 2 is a front view of the chuck shown in Fig. 1.

Fig. 3 is a sectional plan view on a larger scale of a part of the structure shown in the preceding figures, the section being taken on the line 3—3 of Fig. 1.

Fig. 4 is a front elevation on an enlarged scale of the collet shown in Fig. 1.

Figs. 5 and 6 are partial views, partly in section, of a detail of construction showing parts of the chuck in different relative positions;

Fig. 7 is a view similar to Fig. 6 illustrating a structural modification.

Fig. 8 is a sectional side elevation of a chuck of modified construction which also embodies the invention.

Fig. 9 is a sectional side elevation of an arrangement in which the invention is embodied in a chuck which has a slidable block internally mounted in the body.

10 designates a cylindrical member which forms the body of the chuck. In Fig. 1 the front end of the body forms a flat transverse abutment surface 11. 12 is an internally threaded axial bore in the rear end of the body. This extends into a transverse cylindrical bore 13 through the body. The outer cylindrical surface of the body at the ends of this bore are flattened, as shown at 14, in Figs. 1, 3, 5, 6 and 8.

20 is a longitudinally movable sleeve slidably mounted on the outer cylindrical surface of the body 10. In opposite sides of the sleeve are axially alined circular openings 21. In the construction shown in Fig. 1 the forward part of the sleeve is internally threaded, as shown at 22. The outer surface of the sleeve is preferably fluted as shown at 23.

30 is a pressure member provided with an externally threaded portion 31 which engages the threads 22 in the sleeve. 32 (Fig. 1) is a cone-shaped cam surface formed in the pressure member and opening into an axially central bore 33. 34 is a flange extending outwardly from the threaded portion 31. In the periphery of the flange are angularly spaced radially disposed bores 35 for the reception of parts of a spanner wrench by means of which the pressure member may be rotated.

A collet 40 is interposed between the end 11 of the body and the pressure member 30. This may be and preferably is made to embody the invention covered by my Patent #2,346,708, issued April 18, 1943, or in my copending application for patent, Serial No. 510,449, filed November 16, 1943. It comprises a plurality of wedge-shaped rigid gripping members 41 interconnected by a body 42 of resilient material, such as oil-resistant synthetic rubber. Each gripping member has a transverse end 43 which is adapted to be seated on the abutment surface 11 of the body and an outer tapered edge 44 which is adapted to be engaged by the cam surface 32 of the pressure member.

50 is a pin which passes transversely through the sleeve 20 and the body 10. It has circular enlarged heads 51 on its ends which are rotatively fitted in the openings 21 in the sleeve 20 and an intermediate portion 52 of smaller cross-sectional dimensions which forms shoulders with the enlarged heads 51. This intermediate portion is a cam which is eccentric to the axis of rotation of the pin which is the axis of its heads 51. A polygonally sided hole 53 is provided in an end of the pin for the reception of a wrench by which it may be rotated.

In the construction shown in Figs. 1, 3, 5–7 and 9, the bore 13 through the body is a clearance hole for the heads 51 of the pin. By moving the sleeve to bring the openings 21 into alinement with the bore 13 in the body, as shown in Fig. 5, the pin may be inserted. The distance between the shoulders under the heads of the pin is slightly in excess of the distance between the flattened surfaces 14 on the body so that when the pin is centralized the sleeve may be slid forwardly on the body to move its openings 21 out of alinement with the bore 13 so that the forward part of the heads of the pin will overlap the body at the ends of the bore, as shown at 14 in Figs. 1, 3 and 6. If desired, the body may be countersunk at the ends of the bore 13, as shown at 14A in Fig. 7. The diameter of the heads 51 and of the bore 13 is at least as great as the diameter of the intermediate portion 52 of the pin plus its maximum distance from the periphery of the heads due to its eccentricity, so that the cam portion 52 can be rotated 360 degrees within the bore.

60 is a spindle having a tapered shank 61 by means of which the chuck may be applied to a machine tool. A transverse shoulder 62 is formed at the larger end of the shank from which an externally threaded plug 63 extends which fits the threads 12 in the body. The forward end of the plug designated by 64 extends into the bore 13. The distance between the shoulder 62, which abuts the rear end of the body 10 and the end 64 of the plug is such as to make the maximum distance between the end 64 of the plug 53 and the intermediate part 52 of the pin less than the overlap of the heads 51 on the body so that the engagement of the end 64 of the spindle with the cam portion 52 of the pin will prevent lateral displacement of the pin.

When the pressure member 30 is retracted and the high part of the cam 52 moved away from the forward surface of the bore 13, a tool or other article may be inserted in the collet between its gripping members 51. The inner forward ends of the gripping members are beveled to facilitate such insertion. The pressure member is then rotated to move rearwardly in the sleeve. This will move the end 43 of the collet against the abutment surface 11, move the sleeve 20 forwardly on the body and force the gripping members 41 into initial engagement with the article. Rotation then applied to the pin will impart a rearward movement to the sleeve on the body and increase the compression on the collet between the abutment surface 11 and the cone-shaped cam 32 of the pressure member to effect a final grip of the collet on the article within it. It is to be noted that the engagement of the cam portion 52 of the pin and the forward surface of the bore 13 in the body is between arcuate surfaces, thus insuring long life to these parts.

In the chuck shown in Fig. 8, the internal cone shaped cam surface designated by 15 is formed in the body 10A and the position of the collet is reversed to bring the ends 43 of the gripping members into engagement with an abutment surface 36 on the inner side of the flange of a pressure member 30A. In this case the forward part of the sleeve is externally threaded, as at 22A and the pressure member has internal threads 31A to fit it.

The transverse pin and its associated parts may be the same as that shown in preceding figures, and the diameter of the cylindrical bore 13A is sufficient to clear the eccentric cam portion 52 of the transverse pin in all of its rotational positions. A head 51A on one end of the pin is seated in a circular opening 21A in the sleeve and is rotationally supported therein. The diameter of this head and of the opening 21A is slightly larger than that of the clearance bore 13A. A cylindrical boss 51B of smaller diameter than that of the cam portion 52 extends from the other end of the pin in axial alinement with the head 51A into an opening 21B in the sleeve. Shoulders are formed on the pin between the cam portion 52 and the head 51A and between the cam portion and the boss 51B which overlie the body and the sleeve respectively. A split spring ring 54 is seated in an annular groove in the boss and the opening 21B is countersunk to receive the ring.

By making the bore 13A but slightly larger than the cam portion of the pin, the contact of the latter with the forward surface of the bore is widened. The operation of tightening the gripping members of the collet onto an interposed article is similar to that previously described.

In the modification shown in Fig. 9, a longitudinally slidable block 20A having a transverse clearance bore for the heads of the pin is supported in a cylindrical bore in the body 10B. The heads of the pin 50 are rotatively mounted in similar openings 21C which in this case are in the body. The forward parts of the shoulders on the pin overlap the body at the ends of the bore 13B.

After the transverse pin 50 has been placed through the body and the block and the block moved back to overlap the shoulders on the pin, a stop pin 15 is inserted through the body 10B in front of the block 20A to limit the forward movement of the block in order to maintain the openings 21C in the body out of axial alinement with the bore 13B in the block to prevent lateral displacement of the pin 50.

The operation of a chuck of this construction is also similar to that previously described.

Various modifications in construction, mode of operation, method and use of an invention may and do occur to others, especially after benefiting from knowledge of such a disclosure as that herein presented of the principles involved, but the invention itself is not confined to the present showing.

I claim:

1. A chuck comprising inner and outer parts having interfitting surfaces and relatively slidable on each other, a pin passing transversely through both of said parts, said pin having circular ends and an intermediate eccentric cam portion of different transverse dimensions than the diameter of the ends, forming shoulders with the ends, axially alined circular openings in the outer part in which the ends of the pin are rotatively supported, a transverse cylindrical clearance bore for the cam portion of the pin through the inner part, the shoulders of the pin overlapping the parts at the ends of the bore with the cam portion of the pin arranged to engage a surface of said bore, a pressure member in threaded adjustable engagement with the outer part, a gripping device interposed between the pressure member and said inner part, and means for maintaining the openings in the outer part out of axial alinement with the transverse bore in the inner part.

2. A chuck comprising inner and outer parts having interfitting surfaces and relatively slidable on each other, a pin passing transversely through both of said parts, said pin having enlarged circular heads and an intermediate eccentric cam portion of smaller transverse dimensions than the diameter of the heads forming shoulders with the heads, axially alined circular openings in the outer part in which the heads of the pin are rotatively supported, a transverse cylindrical clearance bore for the heads of the pin through said inner part, the shoulders of the pin overlapping the inner part at the forward edges of the ends of the bore therein with the cam portion of the pin arranged to engage a surface of said bore, a pressure member in threaded adjustable engagement with the outer part, a gripping device interposed between the pressure member and the inner part and means for maintaining the openings in the outer part out of axial alinement with the transverse bore in the inner part.

3. A chuck comprising a body member, a longitudinally slidable sleeve mounted on said body member, a pressure member in threaded adjustable engagement with the sleeve, a gripping device interposed between said members, a transverse pin passing through the sleeve and the body member, said pin having enlarged circular heads and an intermediate eccentric cam portion of smaller transverse dimensions than the diameter of the heads forming shoulders with the heads, axially alined circular openings in the sleeve in which the heads of the pin are rotatably supported, a transverse cylindrical clearance bore through the body member for the heads of the pin, the shoulders of the pin overlapping the body member at the forward edges of the ends of the bore therein, with the cam portion of the pin arranged to engage the forward surface of said bore, and means for maintaining the openings in the sleeve out of axial alinement with the transverse bore in the body member.

4. A chuck comprising a body member, a longitudinally slidable sleeve mounted on said body member, a pressure member in threaded adjustable engagement with the sleeve, an abutment surface on one of said members, a cone-shaped cam surface in the other member, a gripping device interposed between said members, a transverse pin passing through the sleeve and the body member, said pin having enlarged circular heads and an intermediate eccentric cam portion of smaller transverse dimensions than the diameter of the heads, forming shoulders with the heads, a transverse cylindrical clearance bore for the heads of the pin through the body member, the shoulders of the pin overlapping the body at the forward edges of the ends of the bore therein, with the cam portion of the pin arranged to engage the forward surface of said bore, and means for maintaining the openings in the sleeve out of axial alinement with the transverse bore in the body member.

5. A chuck comprising a body, a longitudinally slidable sleeve mounted on said body, a pressure member in threaded adjustable engagement with the sleeve, an abutment surface on the body, a cone-shaped cam surface in the pressure member, a gripping device interposed between said body and pressure member, a transverse pin passing through the sleeve and the body, said pin having enlarged circular heads and an intermediate eccentric cam portion of smaller transverse dimensions than the diameter of the heads forming shoulders with the heads, axially alined circular openings in the sleeve in which the heads of the pin are rotatively supported, a transverse cylindrical clearance bore for the heads of the pin through the body, the shoulders of the pin overlapping the body at the forward edges of the ends of the bore therein, with the cam portion of the pin arranged to engage the forward surface of said bore, and means for maintaining the openings in the sleeve out of axial alinement with the transverse bore in the body.

6. A chuck comprising a body, an abutment surface at the forward end of the body, a longitudinally slidable sleeve mounted on said body, a pressure member in threaded adjustable engagement with the sleeve, a cone-shaped surface in the pressure member, a gripping device interposed between said body and pressure member, said pressure member engaging the gripping device beyond the forward end of the body, a transverse pin passing through the sleeve and the body, said pin having enlarged circular heads and an intermediate eccentric cam portion of smaller transverse dimensions than the diameter of the heads forming shoulders with the heads, axially alined circular openings in the sleeve in which the heads of the pin are rotatively supported, a transverse cylindrical clearance bore for the heads of the pin through the body back of said abutment surface, the shoulders of the pin overlapping the body at the forward edges of the ends of the bore therein, with the cam portion of the pin arranged to engage the forward surface of said bore, and means for maintaining the openings in the sleeve out of axial alinement with the transverse bore in the body member.

7. A chuck comprising a body, a longitudinally slidable sleeve mounted on said body, a pressure member in threaded adjustable engagement with the sleeve, an abutment surface on the body, a cone-shaped cam surface in the pressure member, a collet having angularly spaced rigid gripping members with tapered outer surfaces interposed between said body and pressure member with said tapered surfaces arranged to engage the cone-shaped cam, a transverse pin passing through the sleeve and the body, said pin having enlarged circular heads and an intermediate eccentric cam portion of smaller transverse dimensions than the diameter of the heads forming shoulders with the heads, axially alined circular openings in the sleeve in which the heads of the pin are rotatively supported, a transverse cylindrical bore for the heads of the pin through the body, the shoulders of the pin overlapping the body at the forward edges of the ends of the bore therein, with the cam portion of the pin arranged to engage the forward surface of said bore, and means for maintaining the openings in the sleeve out of axial alinement with the transverse bore in the body member.

8. A chuck comprising a body, an abutment surface at the forward end of the body, a longitudinally slidable sleeve mounted on said body, a pressure member in threaded adjustable engagement with the sleeve, a cone-shaped cam surface in the pressure member, a collet having angularly spaced rigid gripping members with tapered outer surfaces and transverse ends interposed between said body and pressure member with said tapered surfaces arranged to be engaged by the cone-shaped cam beyond the forward end of the body and with said transverse ends arranged to be seated on the abutment surface, a transverse pin passing through the sleeve and the body, said pin having enlarged circular heads and an intermediate eccentric cam portion of smaller transverse dimensions than the diameter of the heads forming shoulders with the heads, axially alined circular openings in the sleeve in which the heads of the pin are rotatively supported, a transverse cylindrical clearance bore for the heads of the pin through the body back of said abutment surface, the shoulders of the pin overlapping the body at the forward edges of the ends of the bore therein, with the cam portion of the pin arranged to engage the forward surface of said bore, and means for maintaining the openings in the sleeve out of axial alinement with the transverse bore in the body member.

9. A chuck comprising a body, a flat transverse abutment surface at the forward end of the body, a longitudinally slidable sleeve mounted on said body, a pressure member in threaded adjustable engagement with the sleeve, a cone-shaped cam surface in the pressure member, a collet having angularly spaced rigid gripping members with tapered outer surfaces and transverse flat ends, interposed between said body and pressure member with said tapered surfaces arranged to be engaged by the cone-shaped cam beyond the forward end of the body and with said transverse ends arranged to be seated on the abutment surface, a transverse pin passing through the sleeve and the body, said pin having enlarged circular heads and an intermediate eccentric cam portion of smaller transverse dimensions than the diameter of the heads forming shoulders with the heads, axially alined circular openings in the sleeve in which the heads of the pin are rotatively supported, a transverse cylindrical clearance bore for the heads of the pin through the body back of said abutment surface, the shoulders of the pin overlapping the body at the forward edges of the ends of the bore therein, with the cam portion of the pin arranged to engage the forward surface of said bore, and a supporting spindle affixed to the body having an end extending into the transverse bore therein arranged by engagement with the cam portion of the pin to maintain the openings in the sleeve out of axial alinement with the transverse bore in the body, the maximum distance between the end of the spindle and the cam portion of the pin being less than the overlap of the shoulders on the body.

10. A chuck comprising a body having an inner cylindrical surface, a longitudinally slidable block supported in said body, a pin passing transversely through the body and the block, said pin having enlarged circular heads and an intermediate eccentric cam portion of smaller transverse dimensions than the diameter of the heads forming shoulders with the heads, axially alined circular openings in the body in which the heads of the pin are rotatively supported, a transverse cylindrical clearance bore for the heads of the pin through the block, the shoulders of the pin overlapping parts of the structure at the ends of the bore in the block with the cam portion of the pin arranged to engage a surface of said bore, a pressure member in threaded adjustable engagement with the body, a gripping device interposed between the pressure member and the slidable block, and means for maintaining the openings in the body out of axial alinement with the transverse bore in the block.

11. A chuck comprising a body having an inner cylindrical surface, a longitudinally slidable block supported in said body, a pin passing transversely through the body and the block, said pin having enlarged circular heads and an intermediate eccentric cam portion of smaller transverse dimensions than the diameter of the heads forming shoulders with the heads, axially alined circular openings in the body in which the heads of the pin are rotatively supported, a transverse cylindrical clearance bore for the heads of the pin through the block, the shoulders of the pin overlapping the block at the forward edges of the ends of the bore therein, with the cam portion of the pin arranged to engage the forward surface of said bore, a pressure member in threaded adjustable engagement with the body, a gripping device interposed between the pressure member and the slidable block, and a stop pin in the body arranged to engage the block to limit the forward movement of the block to thereby maintain the openings in the body out of axial alinement with the transverse bore in the block.

12. A chuck comprising inner and outer parts relatively slidable on each other, a pin passing transversely through both of said parts, said pin having axially alined circular ends and an intermediate cylindrical cam portion of a smaller diameter with its axis parallel but out of alinement with the axis of said ends, axially alined circular openings in the outer part in which the ends of the pin are rotatably supported, a transverse clearance bore through the inner part for the cam portion of the pin, with said cam portion of the pin arranged to engage a surface of said bore, a pressure member connected with said outer part, and a gripping device interposed between the pressure member and said inner part.

ARTHUR MERRICK STONER.